US012723957B2

(12) United States Patent
Han et al.

(10) Patent No.: US 12,723,957 B2
(45) Date of Patent: Sep. 1, 2026

(54) EXTREMELY HIGH-TEMPERATURE IN-SITU FRETTING FATIGUE EXPERIMENTAL DEVICE FOR THE MORTISE- TENON JOINT

(71) Applicant: NANJING UNIVERSITY OF AERONAUTICS AND ASTRONAUTICS, Nanjing (CN)

(72) Inventors: Qinan Han, Nanjing (CN); Jianwen Fang, Nanjing (CN); Haitao Cui, Nanjing (CN); Yue Su, Nanjing (CN); Hongjian Zhang, Nanjing (CN); Huiji Shi, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 275 days.

(21) Appl. No.: 18/772,228

(22) Filed: Jul. 14, 2024

(65) Prior Publication Data

US 2024/0369462 A1 Nov. 7, 2024

Related U.S. Application Data

(63) Continuation of application No. PCT/CN2022/115526, filed on Aug. 29, 2022.

(30) Foreign Application Priority Data

May 27, 2022 (CN) ......................... 202210594574.0

(51) Int. Cl.
*G01N 3/00* (2006.01)
*G01N 1/44* (2006.01)
(Continued)

(52) U.S. Cl.
CPC ................. *G01N 3/06* (2013.01); *G01N 3/10* (2013.01); *G01N 2203/0073* (2013.01); *G01N 2203/0226* (2013.01)

(58) Field of Classification Search
CPC .. G01N 1/44; G01N 3/00; G01N 3/06; G01N 3/10; G01N 3/18; G01N 3/32; G01N 3/36;
(Continued)

(56) References Cited

U.S. PATENT DOCUMENTS

2012/0292505 A1 11/2012 Damiano et al.
2016/0116387 A1* 4/2016 Houze ...................... G01N 3/32 73/808
2021/0285901 A1* 9/2021 Han .................. G01N 23/2251

FOREIGN PATENT DOCUMENTS

CN 207516011 U 6/2018
CN 108732035 A 11/2018
(Continued)

OTHER PUBLICATIONS

Machine Translation of CN-110618046-A (Year: 2019).*
(Continued)

*Primary Examiner* — Nguyen Q. Ha

(57) ABSTRACT

The present disclosure discloses an extremely high-temperature in-situ fretting fatigue experimental device for a mortise-tenon joint. The device includes: a loading member configured to support a tenon specimen and a mortise specimen, and apply a fatigue load; a heating member to heat the tenon specimen and the mortise specimen; a thermal insulation sleeve wrapping the heating member; a thermal insulation shield with an observation hole; and a control member configured to control operation of the fatigue loading. Various measures including the using of heat-resistant materials for the gasket, thermal insulation shield and sleeve, reducing and shielding thermal electrons, and
(Continued)

decreasing a temperature in non-critical areas are adopted to improve high-temperature imaging quality of an in-situ Scanning Electron Microscope (in-situ SEM) and enhance an upper limit of an in-situ SEM experimental temperature.

11 Claims, 4 Drawing Sheets

(51) Int. Cl.

| | |
|---|---|
| ***G01N 3/06*** | (2006.01) |
| ***G01N 3/10*** | (2006.01) |
| ***G01N 3/18*** | (2006.01) |
| ***G01N 3/32*** | (2006.01) |
| ***G01N 3/56*** | (2006.01) |

(58) Field of Classification Search

CPC ............. G01N 3/56; G01N 2203/0073; G01N 2203/0226

See application file for complete search history.

(56) References Cited

FOREIGN PATENT DOCUMENTS

| | | | | | |
|---|---|---|---|---|---|
| CN | 109781757 A | | 5/2019 | | |
| CN | 110618046 A | * | 12/2019 | ............... | G01N 3/04 |
| CN | 111443103 A | | 7/2020 | | |
| CN | 114062172 A | | 2/2022 | | |
| CN | 114608979 A | * | 6/2022 | ............... | G01N 3/02 |
| CN | 114813414 A | | 7/2022 | | |
| JP | 2016189326 A | | 11/2016 | | |
| WO | 2014184469 A1 | | 11/2014 | | |

OTHER PUBLICATIONS

Machine Translation of CN-114608979-A (Year: 2022).*

Wang Haijun et al., "Q&A on Thermal Spraying Technology", National Defense Industry Press, Apr. 30, 2006, p. 38.

Ma Tengyun, "Development of an In-Situ Mechanical Testing Device in Sem", China Excellent Master's Thesis Full-text Database Information Technology, vol. 2020, No. 03, Mar. 15, 2020, p. 46-63.

First Office Action dated Jun. 16, 2025 received in corresponding patent family application No. CN202210594574.0. English translation attached.

Second Office Action dated Aug. 28, 2025 received in corresponding patent family application No. CN202210594574.0. English translation attached.

International Search Report dated Feb. 10, 2023 in International Application No. PCT/CN2022/115526. English translation attached.

Liang, Jiecun et al. "In-Situ High-Temperature Mechanical Property Measurement Technology and Its Application in Scanning Electron Microscope" (Scientia Sinica (Physica, Mechanica & Astronomica)), vol. 48, No. 09, Sep. 1, 2018 (Sep. 1, 2018), p. 094606-6, section 3.2, and figure 7.

Giuliano Gregori et al. "In situ SEM imaging at temperatures as high as 1450° C" (Journal of Electron Microscopy), vol. 51, No. 6, Dec. 31, 2002 (Dec. 31, 2002), p. 348, and figure 1.

* cited by examiner

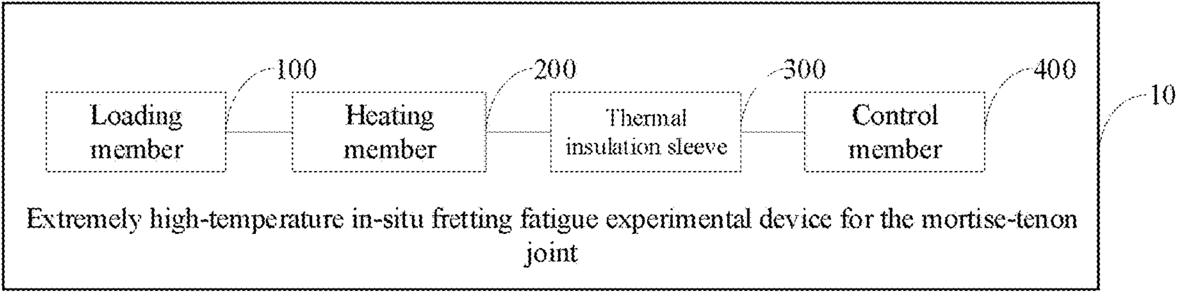
FIG. 1
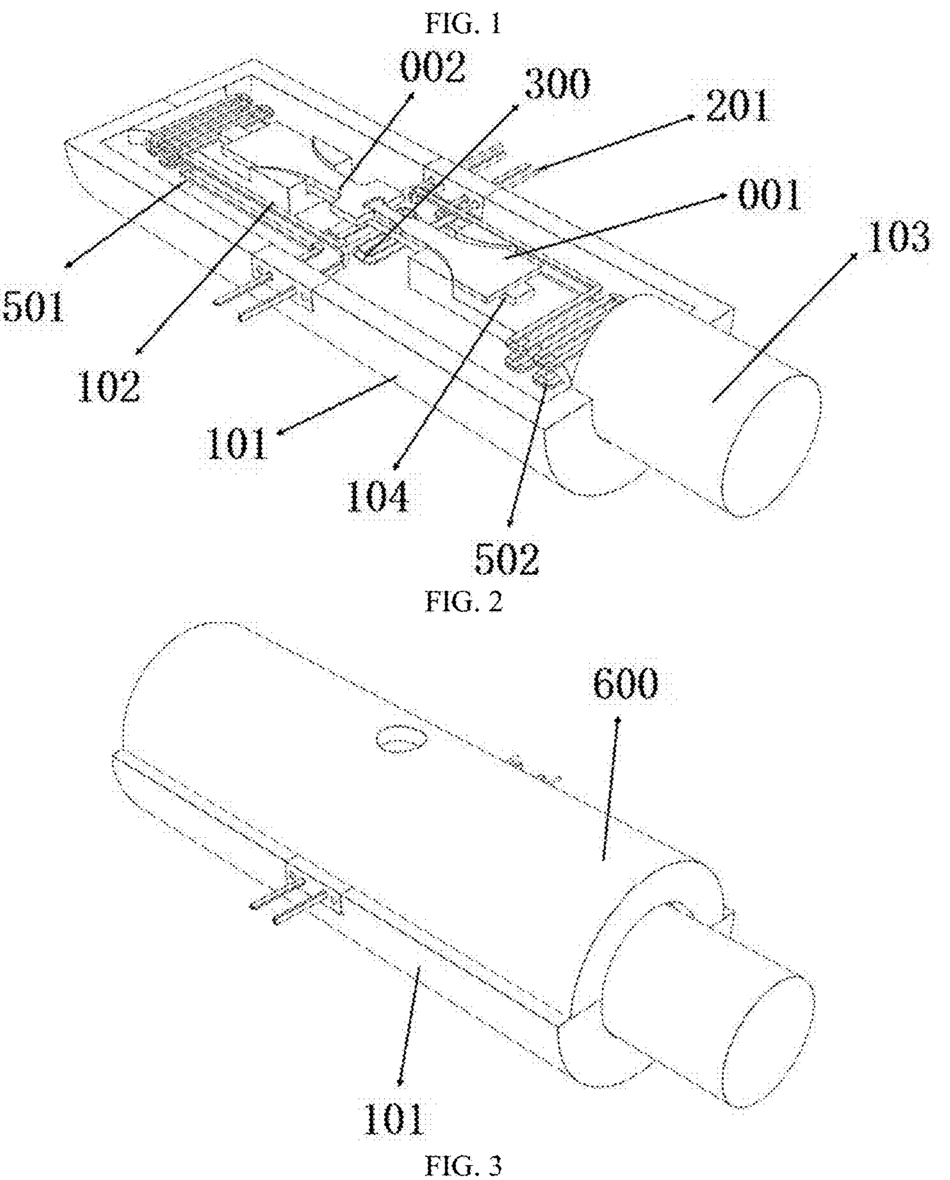
FIG. 2
FIG. 3

EXTREMELY HIGH-TEMPERATURE IN-SITU FRETTING FATIGUE EXPERIMENTAL DEVICE FOR THE MORTISE- TENON JOINT

CROSS-REFERENCES TO RELATED APPLICATIONS

The present application is a continuation of the International Application No. PCT/CN2022/115526 filed on Aug. 29, 2022, which claims priority to Chinese Patent Application No. 202210594574.0, entitled "EXTREMELY HIGH-TEMPERATURE IN-SITU FRETTING FATIGUE EXPERIMENTAL DEVICE FOR THE MORTISE-TENON JOINT", filed on May 27, 2022 by NANJING UNIVERSITY OF AERONAUTICS AND ASTRONAUTICS, both of which are hereby incorporated by reference in their entireties.

FIELD

The present disclosure relates to the technical field of aero-engines, and in particular, to an extremely high-temperature in-situ fretting fatigue experimental device for the mortise-tenon joint.

BACKGROUND

A mortise-tenon joint structure between a blade and a turbine disc of an aero-engine turbine is in a typical fretting fatigue operation condition. A tenon portion of the turbine blade and a mortise portion of the turbine disc bear an alternating contact load. Therefore, an alternating small displacement is generated in the contact area of the mortise-tenon joint structure, enabling crack initiation, crack growth, and eventual fracture failure to occur in a fretting fatigue contact area of the mortise-tenon joint structure. The key to researching a fretting fatigue problem for the mortise-tenon joint structure lies in revealing the damage evolution process of materials under a fretting fatigue load, to clarify the fretting fatigue failure mechanism. In-situ Scanning Electron Microscope (In-situ SEM) technology can perform real-time microscopic observation on a surface of the material during experiments, making it a crucial tool for researching the mechanical properties and behaviors of materials.

During the operation of a Scanning Electron Microscope (SEM), a focused and narrow high-power electron beam is used to scan a sample, signal electrons are generated through interaction between the electron beam and the surface of the sample, and the electrons are collected and imaged by a detector to characterize a microstructure of the surface of the sample. However, a current technical problem is that thermal electrons generated by a heating device or a sample in a high-temperature environment may interfere with the collection of signal electrons by the detector, resulting in a degradation in the quality of high-temperature imaging and an inability to observe effective information due to image whitening. A temperature at a front portion of an advanced aero-engine turbine exceeds 1000° C., and a turbine component is exposed to a harsh and extremely high-temperature environment. Moreover, the mechanical properties and behaviors of a high-temperature alloy, typically a superalloy material used for the turbine component in a high-temperature environment are significantly different from those at a normal temperature. Therefore, it is necessary to restore the extreme high-temperature environment during studying of the fretting fatigue properties and behaviors of the superalloy.

The heating device in the related art is a tungsten electric heating wire, and two test pieces are disposed on the top of a gasket for playing a supporting role. A joint mode of the two test pieces is the mortise-tenon joint. A mortise specimen is fixed through a collet, and a tenon specimen applies a load through a collet of a loading device. Meanwhile, a stainless-steel high-temperature protection shield is used for wrapping an experimental device, which may achieve the effects of heat preservation and thermal electron shielding. A circular hole is defined at the center of the high-temperature shield for observation by using the SEM. The gasket serves to shield some of the thermal electrons of the heating wire, which reduces the influence of the thermal electrons of the heating wire, thereby achieving an in-situ fretting fatigue experiment in an ultra-high temperature environment at 800° C.

However, the method in the related art is unable to achieve imaging in an extremely high-temperature environment higher than 1000° C. The original thermal insulation protection shield of the experimental device is made of steel, and its ability to insulate thermal electrons is very limited. Moreover, the steel itself easily emits a large number of thermal electrons at a high temperature. As a result, there is still thermal electrons interference in a circular hole area of the protection shield, resulting in degradation in image quality of the SEM and that the images appear white when the temperature exceeds 1000° C., thereby making it impossible to observe valid information. Moreover, auxiliary devices such as a loading collet and the protection shield lack cooling, causing these auxiliary devices to emit thermal electrons in an extremely high-temperature environment, further degrading the image quality and affecting the imaging effects of the SEM. In addition, the heating wire is still in an exposed state. When the heating wire is electrically heated to a high temperature, the number of thermal electrons generated by the heating wire rises dramatically with temperature, which seriously affects the imaging of the SEM and leads to degradation in image quality. The heating wire is made of tungsten. Sublimation of the tungsten heating wire occurs in a vacuum and extremely high-temperature environment, leading to interference with imaging and a reduction in image quality. These issues urgently need to be addressed.

SUMMARY

Embodiments of the present disclosure provide an extremely high-temperature in-situ fretting fatigue experimental device for the mortise-tenon joint and aim at solving the problems in the related art of degradation in the quality of high-temperature imaging and an inability to observe useful information because of whitening of images, which are caused by thermal electrons generated by a heating device or a sample in a high-temperature environment interfering with the collection of signal electrons by a detector.

The embodiments of the present disclosure provide an extremely high-temperature in-situ fretting fatigue experimental device for the mortise-tenon joint. The extremely high-temperature in-situ fretting fatigue experimental device for the mortise-tenon joint includes: a loading member configured to support a tenon specimen and a mortise specimen and apply a periodic-reciprocating horizontal fatigue load to the tenon specimen; a heating member disposed below the tenon specimen and the mortise specimen, the heating member being configured to heat the tenon specimen and the mortise specimen; a thermal insulation sleeve wrapping the heating member; and a control member configured to control operation of the loading member to apply the horizontal fatigue load to the tenon specimen and configured to control operation of the heating member to heat the tenon specimen and the mortise specimen.

Optionally, in the embodiments of the present disclosure, the loading member includes: a clamping platform; a first collet clamping the mortise specimen and a second collet clamping the tenon specimen, the first collet and the second collet being both disposed on the clamping platform; a hydraulic power system connected to the second collet, the hydraulic power system being configured to control the second collet to reciprocate periodically in a horizontal direction and apply the horizontal fatigue load to the tenon specimen; and a gasket disposed below the tenon specimen and the mortise specimen.

Optionally, in the embodiments of the present disclosure, the device further includes a thermal insulation shield disposed above the loading member. A mounting space is formed in the thermal insulation shield, an observation hole is defined on the top of the thermal insulation shield, and a contact area of the tenon specimen and the mortise specimen is observed through the observation hole.

Optionally, in the embodiments of the present disclosure, the device further includes a liquid nitrogen circulating pipe disposed above and/or below the first collet and the second collet and configured to cool the first collet and the second collet. By reducing the temperature in this area, the emission of thermal electrons from this area is decreased and the high-temperature imaging quality can be enhanced.

Optionally, in the embodiments of the present disclosure, the control member is further configured to adjust an electronic voltage of a Scanning Electron Microscope to reduce the electronic landing energy of a contact area between the tenon specimen and the mortise specimen. This can reduce the landing energy of electrons, thereby decreasing the generation of thermal electrons, thus enhancing the quality of SEM high-temperature imaging.

Optionally, in the embodiments of the present disclosure, the heating member includes a heating wire wrapped by the thermal insulation sleeve; a thermocouple configured to measure the temperature of the tenon specimen and a temperature of the mortise specimen; and a temperature control system connected to the heating wire and the thermocouple and configured to adjust a temperature of the heating wire.

Optionally, in the embodiments of the present disclosure, the gasket is made of a titanium nitride ceramic composite.

Optionally, in the embodiments of the present disclosure, the heating wire is made of a platinum-rhodium alloy.

Optionally, in the embodiments of the present disclosure, the thermal insulation sleeve for the heating wire is made of aluminum oxide.

Optionally, in the embodiments of the present disclosure, the thermal insulation shield is made of tantalum. Compared to commonly used steel shield, the tantalum shield has superior heat resistance, thereby enhancing the high-temperature imaging quality.

Therefore, the embodiments of the present disclosure have the following beneficial effects.

In the embodiments of the present disclosure, the loading member is used to support the tenon specimen and the mortise specimen and apply the periodic-reciprocating horizontal fatigue load to the tenon specimen. Furthermore, the heating member is wrapped by the thermal insulation shield, and the heating member is used to heat the tenon specimen and the mortise specimen. Finally, the control member is used to control operation of the loading member to apply the horizontal fatigue load to the tenon specimen and is used to control operation of the heating member to heat the tenon specimen and the mortise specimen. The thermal electrons entering the detector are reduced by implementing various measures, which improves the imaging quality of the in-situ SEM in an extremely high-temperature environment and enhances an upper limit of an experimental temperature. Therefore, the problems in the related art of degradation in the quality of high-temperature imaging and an inability to observe useful information because of the whitening of images, which are caused by thermal electrons generated by a heating device or a sample in a high-temperature environment interfering with collection of signal electrons by the detector, are solved.

Additional aspects and advantages of the present disclosure will be provided at least in part in the following description, or will become apparent at least in part from the following description, or can be learned from practicing the present disclosure.

BRIEF DESCRIPTION OF THE DRAWINGS

The above and/or additional embodiments of the present disclosure will become apparent and readily understood from the following description of embodiments in conjunction with the accompanying drawings, in which:

FIG. 1 is an example diagram of an extremely high-temperature in-situ fretting fatigue experimental device for the mortise-tenon joint according to an embodiment of the present disclosure.

FIG. 2 is a schematic structural diagram of an internal structure of an extremely high-temperature in-situ fretting fatigue experimental device for the mortise-tenon joint according to an embodiment of the present disclosure.

FIG. 3 is a schematic diagram of an experimental overall appearance of an extremely high-temperature in-situ fretting fatigue experimental device for the mortise-tenon joint according to an embodiment of the present disclosure.

Figure 4:
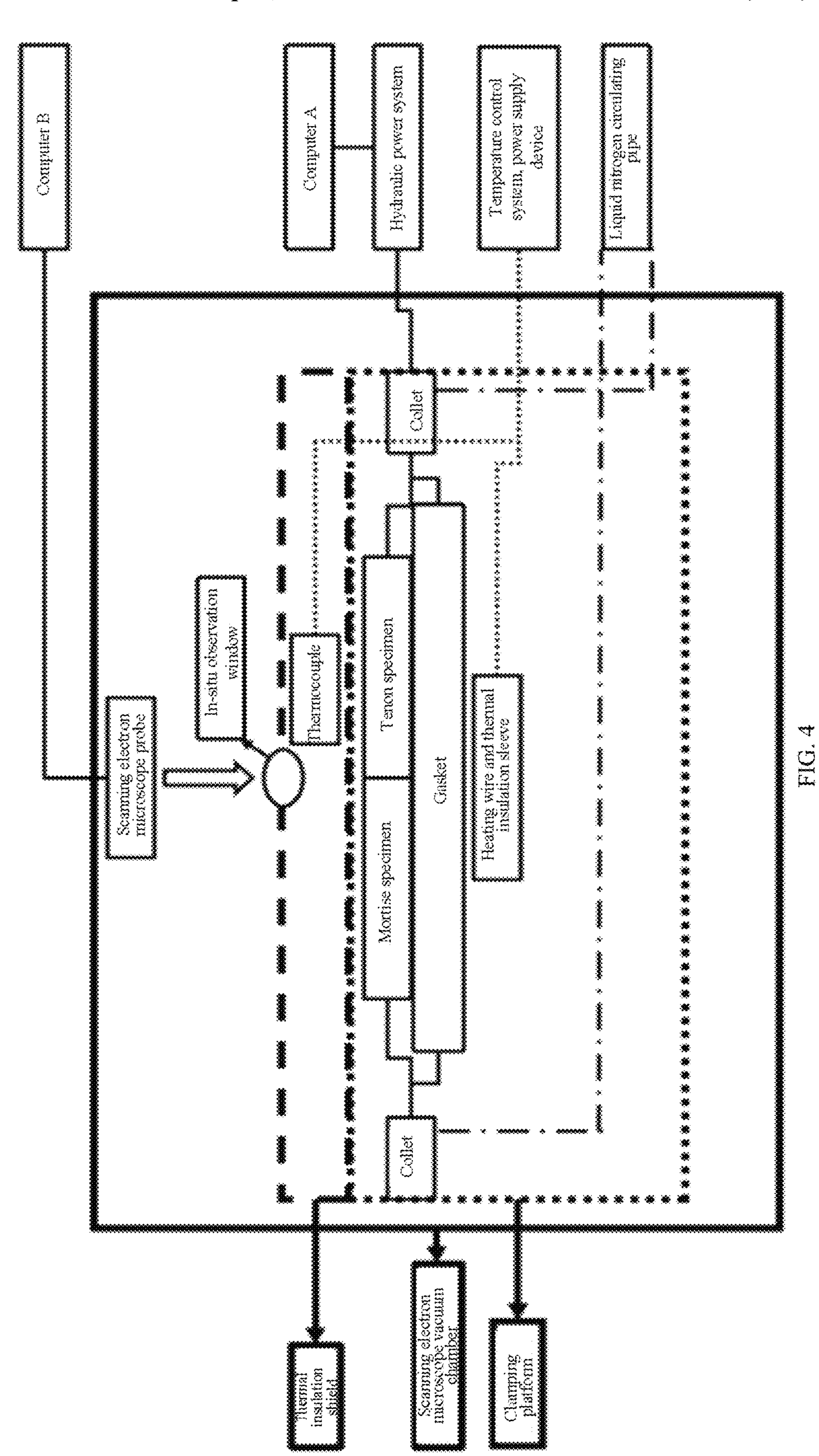
FIG. 4 is a schematic diagram of an overall structure of an extremely high-temperature in-situ fretting fatigue experimental device for the mortise-tenon joint according to an embodiment of the present disclosure.

REFERENCE NUMERALS tenon specimen—001, mortise specimen—002, loading member—100, clamping platform—101, first collet—102, second collet—103, gasket—104, heating member—200, thermal insulation sleeve—300, control member—400, left liquid nitrogen circulating pipe—501, right liquid nitrogen circulating pipe—502, thermal insulation shield—600.

DETAILED DESCRIPTION

The embodiments of the present disclosure will be described in detail below with reference to examples thereof as illustrated in the accompanying drawings, throughout which the same or similar elements, or elements having the same or similar functions, are denoted by the same or similar reference numerals. The embodiments described below with reference to the accompanying drawings are illustrative only and are intended to explain, rather than limit the present disclosure.

An extremely high-temperature in-situ fretting fatigue experimental device for the mortise-tenon joint in the embodiments of the present disclosure is described below with reference to the accompanying drawings. Aiming to solve the problems mentioned in the background art, the present disclosure provides an extremely high-temperature in-situ fretting fatigue experimental device for the mortise-tenon joint. In the present disclosure, a loading member is used to support a tenon specimen and a mortise specimen and apply a periodic-reciprocating horizontal fatigue load to the tenon specimen. Furthermore, the heating member is wrapped by a thermal insulation sleeve, and a heating member is used to heat the tenon specimen and the mortise specimen. Finally, a control member is used to control operation of the loading member to apply the horizontal fatigue load to the tenon specimen and is used to control operation of the heating member to heat the tenon specimen and the mortise specimen. In this way, the thermal electrons entering the detector are reduced, which improves the imaging quality of an in-situ SEM in an extremely high-temperature environment and improves an upper limit of an experimental temperature. Therefore, the present disclosure solves the problems in the related art that thermal electrons generated by a heating device or a sample in a high-temperature environment interfere with the collection of signal electrons by a detector, which leads to the inability to observe useful information due to degradation in high-temperature imaging quality and image whitening.

Specifically, FIG. 1 is a block diagram of an extremely high-temperature in-situ fretting fatigue experimental device for the mortise-tenon joint according to an embodiment of the present disclosure.

As illustrated in FIG. 1, the extremely high-temperature in-situ fretting fatigue experimental device for the mortise-tenon joint includes a loading member 100, a heating member 200, a thermal insulation sleeve 300, and a control member 400.

Specifically, as illustrated in FIG. 2, a loading member 100 is configured to support a tenon specimen 001 and a mortise specimen 002 and apply a periodic-reciprocating horizontal fatigue load to the tenon specimen 001. The heating member 200 is disposed below the tenon specimen 001 and the mortise specimen 002. The heating member 200 is configured to heat the tenon specimen and the mortise specimen. The thermal insulation sleeve 300 wraps the heating member. The control member 400 is configured to control operation of the loading member 100 to apply the horizontal fatigue load to the tenon specimen 001 and is configured to control operation of the heating member 200 to heat the tenon specimen 001 and the mortise specimen 002.

It should be noted that, as illustrated in FIG. 3, core portions of the extremely high-temperature in-situ fretting fatigue experimental device 10 for the mortise-tenon joint, such as the loading member 100, the heating member 200, the thermal insulation sleeve 300, the control member 400, etc., are all located in a vacuum chamber of the SEM, and an overall shape of the core portion is cylindrical.

Optionally, in an embodiment of the present disclosure, as illustrated in FIG. 2, the loading member 100 includes: a clamping platform 101; a first collet 102 clamping the mortise specimen 002 and a second collet 103 clamping the tenon specimen 001, the first collet 102 and the second collet 103 being both disposed on the clamping platform 101; a hydraulic power system (not illustrated in figures) connected to the second collet 103, the hydraulic power system is configured to control the second collet 103 to reciprocate periodically in a horizontal direction and apply the horizontal fatigue load to the tenon specimen 001; and a gasket 104 disposed below the tenon specimen 001 and the mortise specimen 002.

In a specific embodiment, as illustrated in FIG. 4, the loading member includes a clamping platform, two collets, a gasket, a hydraulic power system, and a computer A. The two collets are used for clamping the specimens. One collet clamps the mortise specimen and is kept fixed during an experiment, and another collet clamps the tenon specimen and is connected to the hydraulic power system. The hydraulic power system controls the collet clamping the tenon specimen to reciprocate, to apply a tension-tension fatigue load to the tenon specimen, thereby generating a fretting fatigue load in the contact area.

An elongated gasket is lapped on the two collets, and the specimen is placed above the gasket. The gasket has a plurality of functions. Firstly, the gasket plays a role in supporting the specimens to support the tenon specimen and the mortise specimen, enabling the two specimens to correctly form a fretting fatigue contact operation condition under the tension-tension fatigue load. Secondly, in the embodiments of the present disclosure, the gasket is made of a ceramic material of titanium nitride that may withstand extremely high temperatures. This material generates fewer thermal electrons in a high-temperature environment and causes minimal interference to the imaging of the SEM. Therefore, it is possible to lower the interference of thermal electrons on imaging and improve the imaging quality of the SEM at an extremely high temperature.

It can be understood that the hydraulic power system is controlled by computer A, so as to achieve the purpose of controlling parameters such as the size and frequency of the load. In addition, it enables control over the overall progress, pause, and termination of the entire experiment.

Optionally, in an embodiment of the present disclosure, as illustrated in FIG. 2 and FIG. 4, the heating member 200 includes a heating wire 201 wrapped by the thermal insulation sleeve 300; a thermocouple configured to measure a temperature of the tenon specimen 001 and a temperature of the mortise specimen 002; and a temperature control system connected to the heating wire 201 and the thermocouple and configured to adjust a temperature of the heating wire 201.

In some embodiments, as illustrated in FIG. 4, the heating member 200 includes a platinum-rhodium alloy heating wire 201 wrapped with aluminum oxide sleeve 300, a thermocouple, a temperature control system, and a power supply device, and is located at an interconnection portion between the internal and external portions of the experimental device.

Specifically, since the heating wire is a component that has a high temperature and a propensity to emit thermal electrons, in the embodiments of the present disclosure, a platinum-rhodium alloy is chosen for manufacturing an electric heating wire. Compared with a conventional tungsten heating wire, the platinum-rhodium alloy is less likely to sublime or volatilize in a high-temperature vacuum environment, thereby reducing the interference in the imaging quality. Meanwhile, in the embodiments of the present disclosure, the heating wire 201 is wrapped by a thermal insulation sleeve 300 made of heat-resistant aluminum oxide, and the thermal electrons generated by the heating wire 201 are shielded by the thermal insulation sleeve 300 so as to be prevented from escaping, which decreases the emission of thermal electrons of the heating wire 201, thereby reducing the influence of the thermal electrons emitted by the heating wire 201 on the imaging of the SEM. In addition, in the embodiments of the present disclosure, the heating wire is isolated beneath the gasket, enabling the thermal electrons emitted by the heating wire to be blocked and shielded by the gasket. This arrangement prevents the thermal electrons from continuing to moving upwards and reach an SEM probe and further lowers the interference in the imaging quality.

It can be understood that by adopting the above measures, not only the interference of thermal electrons on the imaging of the SEM is effectively reduced, but also the imaging quality of the SEM at a high temperature is improved. In this case, the SEM may observe microstructure damage evolution on the surface of the specimen in real time under an extremely high-temperature environment exceeding 1000° C.

In the process of the experiment, the heating wire is powered on. As the temperature of the heating wire rises, the specimen is heated through radiant heating, and the thermocouple feeds back a temperature of the specimen to the temperature control system in real-time, thereby ensuring that the specimen is stable at a predetermined temperature.

Optionally, in an embodiment of the present disclosure, as illustrated in FIG. 2 and FIG. 4, the extremely high-temperature in-situ fretting fatigue experimental device 10 for the mortise-tenon joint further includes a liquid nitrogen circulating pipe (the embodiments of the present disclosure provide a left liquid nitrogen circulating pipe 501 disposed at the first collet and a right liquid nitrogen circulating pipe 502 disposed at the second collet) disposed above and/or below the first collet 102 and the second collet 103 and configured to cool the first collet 102 and the second collet 103.

It should be noted that the liquid nitrogen circulating pipe is also located at the interconnection portion between the internal and external portions of the experimental device. The liquid nitrogen circulating pipe may cool the first collet and the second collet, to reduce the temperature of the first collet and the temperature of the second collet. Moreover, the emission of thermal electrons of a material of the cooled loading collet decreases. Therefore, the thermal electron interference is mitigated and the imaging quality of the SEM is improved. In the embodiments of the present disclosure, it is only necessary for a temperature of a fretting contact area to reach and remain at a target temperature. Therefore, the temperature reduction of the collet does not affect the success of the experiment.

In addition, in the embodiments of the present disclosure, a liquid nitrogen cooling system based on the liquid nitrogen circulation pipe also lowers the temperature of a non-critical observation area outside the fretting contact area, thereby reducing the thermal electron emission of a non-critical observation region device and further improving imaging quality of a high-temperature SEM.

Optionally, in an embodiment of the present disclosure, as illustrated in FIG. 3, the extremely high-temperature in-situ fretting fatigue experimental device 10 for the mortise-tenon joint further includes a thermal insulation shield 600 disposed above the loading member 100. A mounting space is formed in the thermal insulation shield 600, an observation hole is defined on the top of the thermal insulation shield 600, and a contact area of the tenon specimen 001 and the mortise specimen 002 is observed through the observation hole.

In the embodiments of the present disclosure, the thermal insulation shield is made of tantalum metal instead of steel. Tantalum metal is chosen because of its ability to withstand extremely high temperatures. Compared to steel, Tantalum typically has a higher melting point and thermal conductivity. Under the same heating power, the temperature of the specimen is higher, which indirectly expands the heating range of the heating device. In addition, tantalum is high in temperature resistance and less in thermal electron emission at a high temperature compared with general materials, which reduces thermal electron emission of the thermal insulation shield 600, thereby enhancing the quality of high-temperature SEM imaging. Therefore, the tantalum thermal insulation shield 600 may isolate the thermal electrons within the thermal insulation shield without reaching the SEM probe, thereby significantly improving the thermal electron isolation effect. A small hole is reserved on the top of the tantalum thermal insulation shield, allowing secondary electrons emitted from the fretting contact area to reach the SEM probe and secondary electronic imaging is formed to obtain a secondary electron microscopic observation image of the fretting fatigue contact area.

It can be understood that in the above experimental device, a joint mode between the tenon specimen and the mortise specimen is a tenon joint. The specimens are made of superalloys. The contact area of the tenon specimen and the mortise specimen is located right below the SEM. This arrangement allows the entire contact area to be observed through the SEM. Therefore, it is beneficial to observe the entire process of crack initiation and propagation. A specific observation process will be described in detail below.

Optionally, in an embodiment of the present disclosure, the control member is further configured to adjust an electronic voltage of a Scanning Electron Microscope to reduce an electronic landing energy of a contact area between the tenon specimen and the mortise specimen.

In the embodiments of the present disclosure, a process of damage evolution of the contact area may be observed in real-time by means of the in-situ SEM. In addition, in the embodiments of the present disclosure, as illustrated in FIG. 4, a computer (computer B) is further included and is provided with a control software of the SEM. After the specimen is loaded into the vacuum chamber and focusing is completed, the electronic voltage of the SEM is adjusted by adjusting a parameter of the control software, thereby suppress the overflow of generation of thermal electrons, thus enhancing the quality of high-temperature SEM imaging.

It can be understood that, in the embodiments of the present disclosure, when real-time observation is performed, the electronic voltage of the SEM is adjusted by means of computer B, which not only lowers the landing energy of electron beams of the SEM reaching the specimen and suppresses thermal electron overflow, but also reduces optical path distortion, obtains a smaller beam spot diameter, and improves a signal-to-noise ratio in high-temperature SEM imaging. Therefore, the imaging quality of the SEM is improved, leading to clearer images.

In addition, computer B is also capable of capturing and storing SEM images, which may be used for subsequent analysis of the damage process and failure mechanisms.

Figures 5, 6, 7:
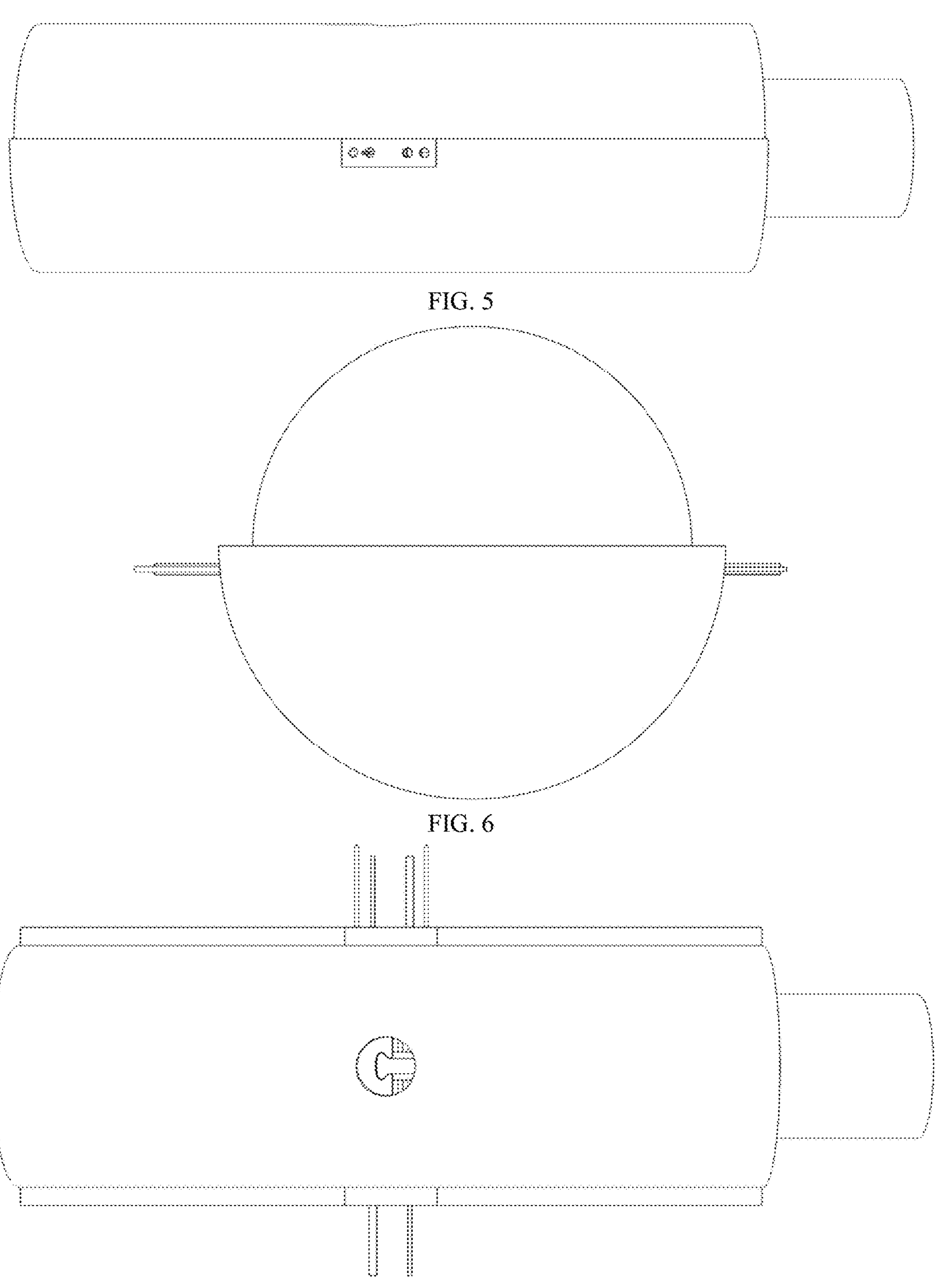
FIG. 5 is a schematic front structural diagram of an extremely high-temperature in-situ fretting fatigue experimental device for the mortise-tenon joint (including a thermal insulation shield) according to an embodiment of the present disclosure.
FIG. 6 is a schematic side structure diagram of an extremely high-temperature in-situ fretting fatigue experimental device for the mortise-tenon joint (including a thermal insulation shield) according to an embodiment of the present disclosure.
FIG. 7 is a schematic top view of an extremely high-temperature in-situ fretting fatigue experimental device for the mortise-tenon joint (including a thermal insulation shield) according to an embodiment of the present disclosure.
Figures 8, 9, 10:
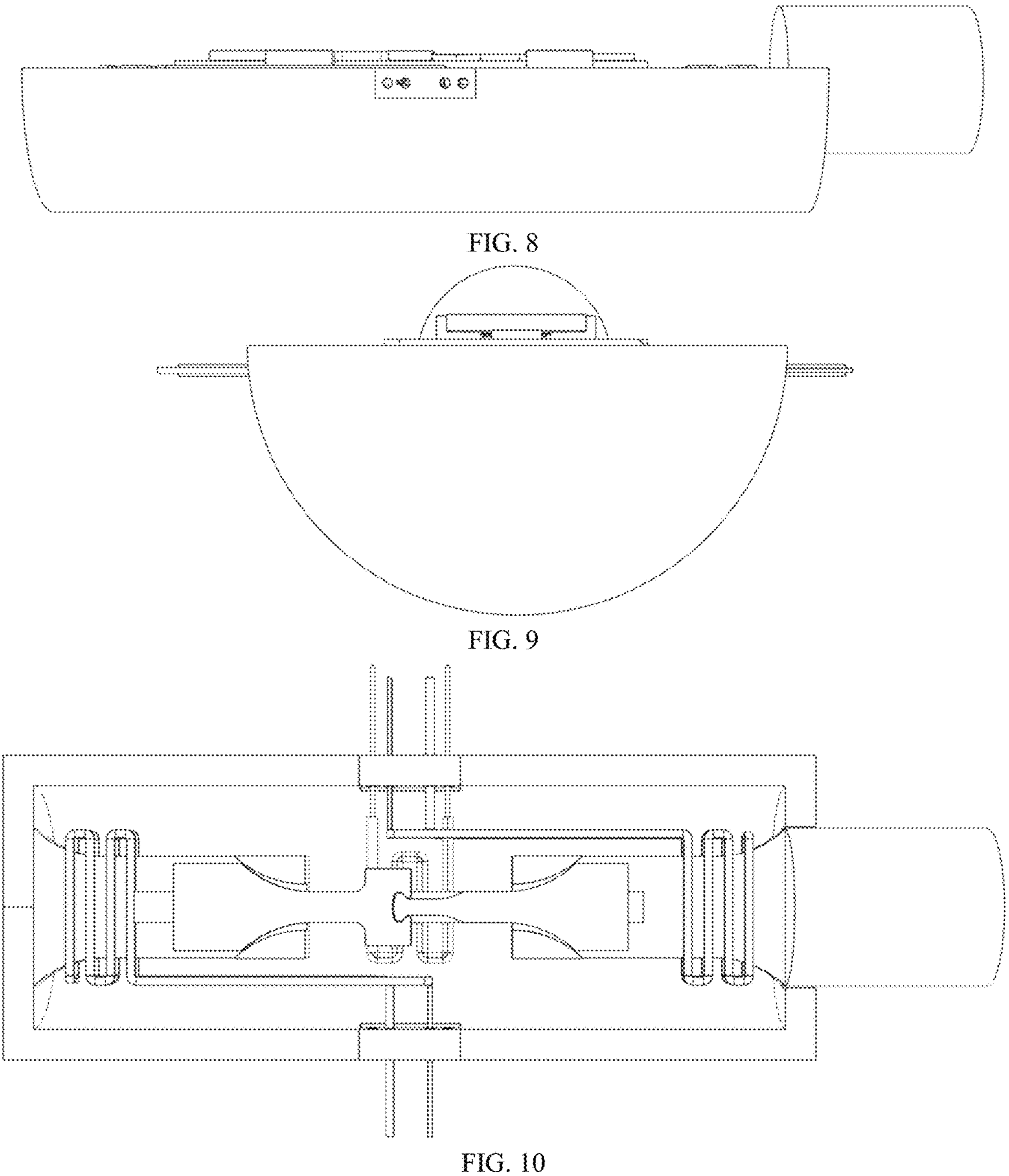
FIG. 8 is a schematic front structural diagram of an extremely high-temperature in-situ fretting fatigue experimental device for the mortise-tenon joint (without a thermal insulation shield) according to an embodiment of the present disclosure.
FIG. 9 is a schematic side structure diagram of an extremely high-temperature in-situ fretting fatigue experimental device for the mortise-tenon joint (without a thermal insulation shield) according to an embodiment of the present disclosure.
FIG. 10 is a schematic top view of an extremely high-temperature in-situ fretting fatigue experimental device for the mortise-tenon joint (without a thermal insulation shield) according to an embodiment of the present disclosure.

As illustrated in FIG. 5 to FIG. 7, the extremely high-temperature in-situ fretting fatigue experimental device for the mortise-tenon joint includes a front view, a side view, and a top view of the appearance structure of the thermal insulation shield. After the thermal insulation shield is removed, the front view, the side view, and the top view of the appearance structure of the device are illustrated in FIG. 8 to FIG. 10.

An operating method for the extremely high-temperature in-situ fretting fatigue experimental device for the mortise-tenon joint in the present disclosure is described below.

Firstly, the clamping platform is pulled out from the vacuum chamber of the SEM for the purpose of facilitating specimen installation. Subsequently, the gasket and the specimen are mounted, other auxiliary devices are installed, and then the thermal insulation shield is installed. Then, the assembled experiment device is pushed into the vacuum chamber of the SEM. After the chamber is sealed, a vacuum device of the SEM is turned on to vacuumize the whole chamber.

Secondly, the heating member is switched on, enabling the SEM vacuum chamber to reach a predetermined temperature. Then, the SEM is turned on, and focusing is performed until the microstructure of the surface of the specimen is clearly visible. Afterward, the hydraulic power system is turned on to start applying the tension-tension fatigue load to the specimen, real-time observation is carried out through a computer screen, and the fretting fatigue damage evolution process of the specimen is captured and stored.

Finally, after the experiment is finished, the hydraulic power system, the SEM, the temperature control system, and the vacuum device are sequentially switched off in reverse order to the order in which they are turned on in the experiment. The specimen, the gasket, and the other auxiliary devices are sequentially detached after the clamping platform is pulled out.

With the extremely high-temperature in-situ fretting fatigue experimental device for the mortise-tenon joint provided by the present disclosure, firstly, the loading member is used to support the tenon specimen and the mortise specimen and apply the periodic-reciprocating horizontal fatigue load to the tenon specimen. And then, the heating member is wrapped by the thermal insulation sleeve, and the heating member is used to heat the tenon specimen and the mortise specimen. Finally, the control member is used to control operation of the loading member to apply the horizontal fatigue load to the tenon specimen and is used to control operation of the heating member to heat the tenon specimen and the mortise specimen. The thermal electrons entering the detector are reduced by implementing various measures, which improve the imaging quality of the in-situ SEM in the extreme high-temperature condition and enhance the upper limit of the experimental temperature.

In the description of this specification, descriptions with reference to the terms "an embodiment", "some embodiments", "examples", "specific examples", or "some examples" etc., mean that specific features, structures, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or N embodiments or examples in a suitable manner. In addition, those skilled in the art can combine the different embodiments or examples and the features of the different embodiments or examples described in this specification without contradicting each other.

In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include at least one of the features. In the description of the present disclosure, "N" means at least two, unless otherwise specifically defined.

What is claimed is:

1. An extremely high-temperature in-situ fretting fatigue experimental device for a mortise-tenon joint, comprising:
- a loading member configured to support a tenon specimen and a mortise specimen, and apply a periodic-reciprocating horizontal fatigue load to the tenon specimen;
- a heating member disposed below the tenon specimen and the mortise specimen, the heating member being configured to heat the tenon specimen and the mortise specimen;
- a thermal insulation sleeve wrapping the heating member; and
- a control member configured to control operation of the loading member to apply the horizontal fatigue load to the tenon specimen, and configured to control operation of the heating member to heat the tenon specimen and the mortise specimen.

2. The device according to claim 1, wherein the loading member comprises:
- a clamping platform;
- a first collet clamping the mortise specimen and a second collet clamping the tenon specimen, the first collet and the second collet being both disposed on the clamping platform;
- a hydraulic power system connected to the second collet, the hydraulic power system being configured to control the second collet to reciprocate periodically in a horizontal direction and apply the horizontal fatigue load to the tenon specimen; and
- a gasket disposed below the tenon specimen and the mortise specimen.

3. The device according to claim 1, further comprising:
- a thermal insulation shield disposed above the loading member, a mounting space being formed in the thermal insulation shield, an observation hole being defined on the top of the thermal insulation shield, and a contact area of the tenon specimen and the mortise specimen being observed through the observation hole.

4. The device according to claim 2, further comprising:

a liquid nitrogen circulating pipe disposed above and/or below the first collet and the second collet and configured to cool the first collet and the second collet.

5. The device according to claim 1, wherein the control member is further configured to adjust an electronic voltage of a Scanning Electron Microscope to reduce electronic landing energy of a contact area between the tenon specimen and the mortise specimen.

6. The device according to claim 1, wherein the heating member comprises:

a heating wire wrapped by the thermal insulation sleeve;

a thermocouple configured to measure a temperature of the tenon specimen and a temperature of the mortise specimen; and a temperature control system connected to the heating wire and the thermocouple and configured to adjust a temperature of the heating wire.

7. The device according to claim 2, wherein the gasket is made of a ceramic material of titanium nitride.

8. The device according to claim 6, wherein the heating wire is made of a platinum-rhodium alloy.

9. The device according to claim 1, wherein the thermal insulation sleeve for the heating wire is made of aluminum oxide.

10. The device according to claim 3, wherein the thermal insulation shield is made of tantalum.

11. The device according to claim 4, wherein the liquid nitrogen circulating pipe includes a left liquid nitrogen circulating pipe disposed at the first collet and a right liquid nitrogen circulating pipe disposed at the second collet.

* * * * *